G. B. KOHLER.
FARE BOX.
APPLICATION FILED FEB. 1, 1909.
917,616.
Patented Apr. 6, 1909.
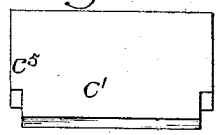
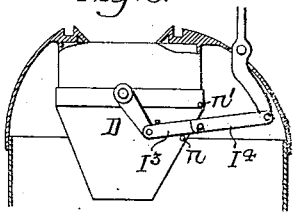
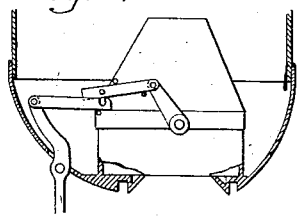
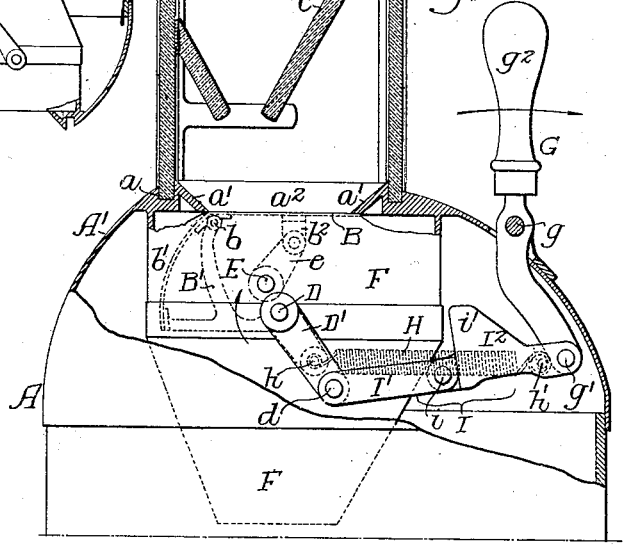
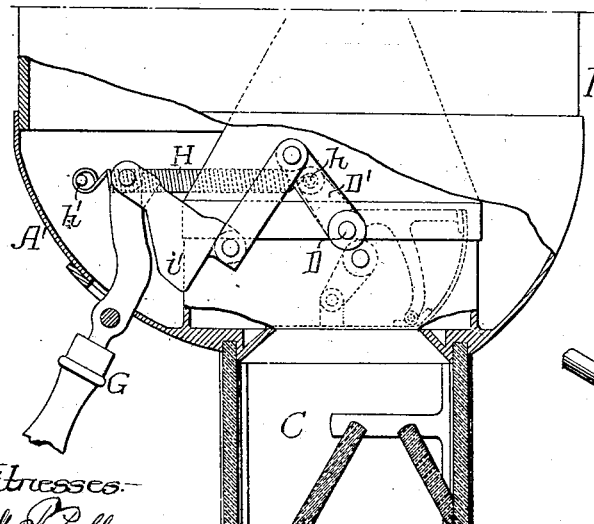
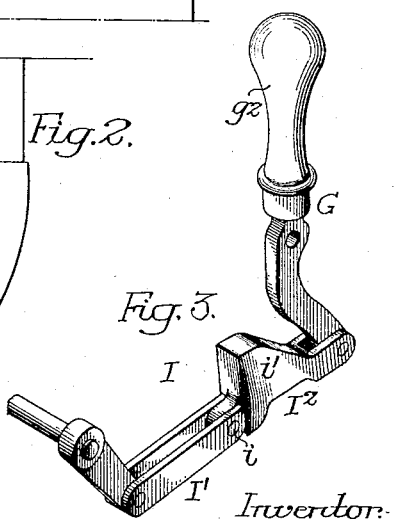
Witnesses
Inventor:
George B. Kohler
by his Attorneys

UNITED STATES PATENT OFFICE.

GEORGE B. KOHLER, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

FARE-BOX.

No. 917,616.          Specification of Letters Patent.          Patented April 6, 1909.

Application filed February 1, 1909. Serial No. 475,415.

*To all whom it may concern:*

Be it known that I, GEORGE B. KOHLER, a citizen of the United States, residing in Philadelphia, Pennsylvania, have invented certain Improvements in Fare-Boxes, of which the following is a specification.

The main object of my invention is to so construct a fare box that the operating lever for discharging the fare into the body of the box cannot actuate the discharge means if the fare box is inverted, thus preventing the discharge of any fares should the box be turned upside down.

The invention further relates to certain details of construction which will be described hereafter.

In the accompanying drawings:—Figure 1, is a side view, partly in section, of the upper portion of a box illustrating my invention; the fare box being in the upright position; Fig. 2, is a view showing a portion of the fare box inverted; Fig. 3, is a detached perspective view of the operating lever and connecting rod; Fig. 4, is a view of one of the glass deflecting plates, and Figs. 5 and 6, are views illustrating modifications of my invention.

A is the body of the fare box. In the lower portion of the body is the fare receiving section, which may be of any form; the mechanism on this particular portion of the box being omitted in order to avoid confusion.

C is the fare receiving section of the fare box mounted on the portion A' containing the discharge mechanism. The fare receiving section has glazed sides $c$ and glazed inclined deflectors $c'$ for the passage of the fare. The fare receiving section is preferably quadrangular in shape and in each corner is a metallic standard C' in which the glazed sides $c$ are mounted. On the top of the fare receiving section is a frame $C^2$ flanged to fit over the glazed sides and this frame rests directly upon the standards C' and is secured thereto by screws $c^2$. Projecting from the standards are brackets $c^3$ hooked at their outer ends $c^4$ to engage the edges $c^5$ of the deflecting plates $c'$. The hooks do not extend above the surface of the glass and therefore do not interfere with the free passage of the fare over the deflectors into the receptacle.

The upper deflectors are held in place by the frame $C^2$ and this frame is preferably inclined on the same line as the deflectors, as shown in Fig. 1. The portion A' is recessed at $a$ to receive the glazed sides $c$ and there is a beveled portion $a'$ which surrounds the opening $a^2$ into the body of the box. Closing this opening is a plate B pivoted at $b$ to a frame B' carrying a grooved plate $b'$ and this frame is pivoted to a shaft D having an operating arm D'. The plate B has a lug $b^2$, which is pivoted to an arm $e$ mounted on a stud on the shaft E. When the shaft D is turned in the direction of the arrow, Fig. 1, the plate B will be moved forward and will turn on its pivot $b$ discharging the fare into the chute F, which communicates with the fare receiving section in the box, while the plate $b'$ closes the opening so as to prevent any fares entering the box without passing over the plate B.

G is an operating lever pivoted at $g$ to a bracket on the portion A' of the casing and this lever extends through an opening in the casing and is pivoted at $g'$ to a link I, which is attached at $d$ to the arm D'. The operating lever G has a handle $g^2$, which is shaped to be grasped by the conductor so that as the operating lever is moved in the direction of the arrow, Fig. 1, it will turn the shaft D and trip the plate B so as to discharge the fare resting on the plate into the body of the box.

One method of tampering with a fare box of this type is to turn the fare box upside down and to work it so that the fares in the body of the box will be discharged through the hopper F and by actuating the lever the fares can be discharged into the fare receiving section C and from this receptacle the fares can be readily removed.

One of the main features of my invention is to prevent the manipulating of the plate or platform B when the box is inverted and this object I attain by making the connecting rod I in two parts I', I², pivoted at $i$ and in the present instance I make a weight $i'$ integral with the part I² so that when the box is inverted, as in Fig. 2, the weighted portion of the link I will drop, as indicated in said figure, so that on operating the lever G it will simply move without imparting movement to the frame D' on the shaft D.

A spring H is connected at $h$ to the arm $d'$ and to a pin $h'$ on the casing A'. This spring is for the purpose of returning the shaft D, plate B and operating lever G to their normal positions as soon as released by the conductor and also aids in breaking the connecting link when the box is inverted, as in Fig. 2, as it tends to draw the arm D' toward the lever G. As soon as the box is again placed in proper position on the first movement of the operating lever G the link will assume the proper position as illustrated in Fig. 1.

In Figs. 5 and 6, I have shown a modification of the link. In this instance the two sections of the link are made so that when broken one is entirely independent of the other and the section I³ has a pin which is adapted to a slot in the section I⁴ and stops n—n' are formed on the casing so that when the link is in the position shown in Fig. 5 the section I⁴ of the link engages the pin on the section I³ and the shaft D can be actuated by the operating lever, but when the fare box is inverted, as in Fig. 6, then the section I⁴ drops away from the section I³ and consequently the shaft D cannot be actuated by the operating lever, but as soon as the box is again placed in its normal position, then the two parts will drop into engagement. Any other means may be resorted to for throwing the operating lever out of action without departing from the essential features of the invention.

While I have described my invention as particularly adapted for use as a fare box in passenger cars, it will be understood that it may be used for collecting coins or tickets for any purpose.

I claim:

1. The combination in a fare box, of a discharging device, an operating lever, and means connecting the lever with the discharging device, said means being so constructed that when in the upright position the lever will actuate the discharging device, but when the box is inverted the connection between the two parts will be broken.

2. The combination in a fare box, of a fare receiving section, a discharging device at the bottom of the said section, an operating lever, a link made in two parts and connecting the lever with the discharging device, the two parts of the link being so connected that the lever will operate the discharging device when the box is in an upright position, but when inverted the link will be thrown out of operative position.

3. The combination in a fare box, of a fare receiving section, a discharging device at the bottom of the said section, an operating lever, a link connecting the operating lever with the discharging device, said link being made in two parts connected together by a pivot, the parts being so arranged that when the box is in the upright position the lever will actuate the discharging device, but when the box is inverted the two parts of the link will be thrown out of line so as to prevent the discharging device being operated by the lever.

4. The combination in a fare box, of a fare receiving section, a discharging device at the base of the said section, an operating lever, a link connecting the operating lever with the discharging device, said link being made in two parts connected together by a pivot, with a weight on one of said parts so that when the fare box is inverted the link will drop out of operative position to prevent the device being operated by the lever.

5. The combination in a fare box, of a fare receiving section, a shaft, a discharging device pivoted to the shaft mounted under the fare receiving section, an arm on said shaft, an operating lever having a handle projecting through the casing of the fare box, a link connecting the lever with the said arm, said link being made in two parts pivoted together, a weight on one part so that when the box is inverted the link will be thrown out of operative position to prevent the discharging device being operated by the lever.

6. The combination in a fare box, of a fare receiving section, a shaft, a frame mounted on the shaft, a plate pivoted to the frame and adapted to normally close the bottom of the fare receiving section, a second plate adapted to the frame and arranged to close the fare receiving section when the first mentioned plate is shifted, an arm connected to the first mentioned plate so that the plate will tilt when shifted, an arm on the shaft, an operating lever, a link connecting the operating lever with the arm, and a spring tending to keep the first mentioned plate in its normal position.

In testimony whereof, I have signed my name to this specification, in the presence of two subscribing witnesses.

GEORGE B. KOHLER.

Witnesses:
 JNO. J. GARTLAU,
 HENRY C. ESLING.